Oct. 18, 1966  R. E. LASSITER  3,279,450
STEAM UNIT FOR FROZEN FOODS
Filed July 7, 1965  3 Sheets-Sheet 1
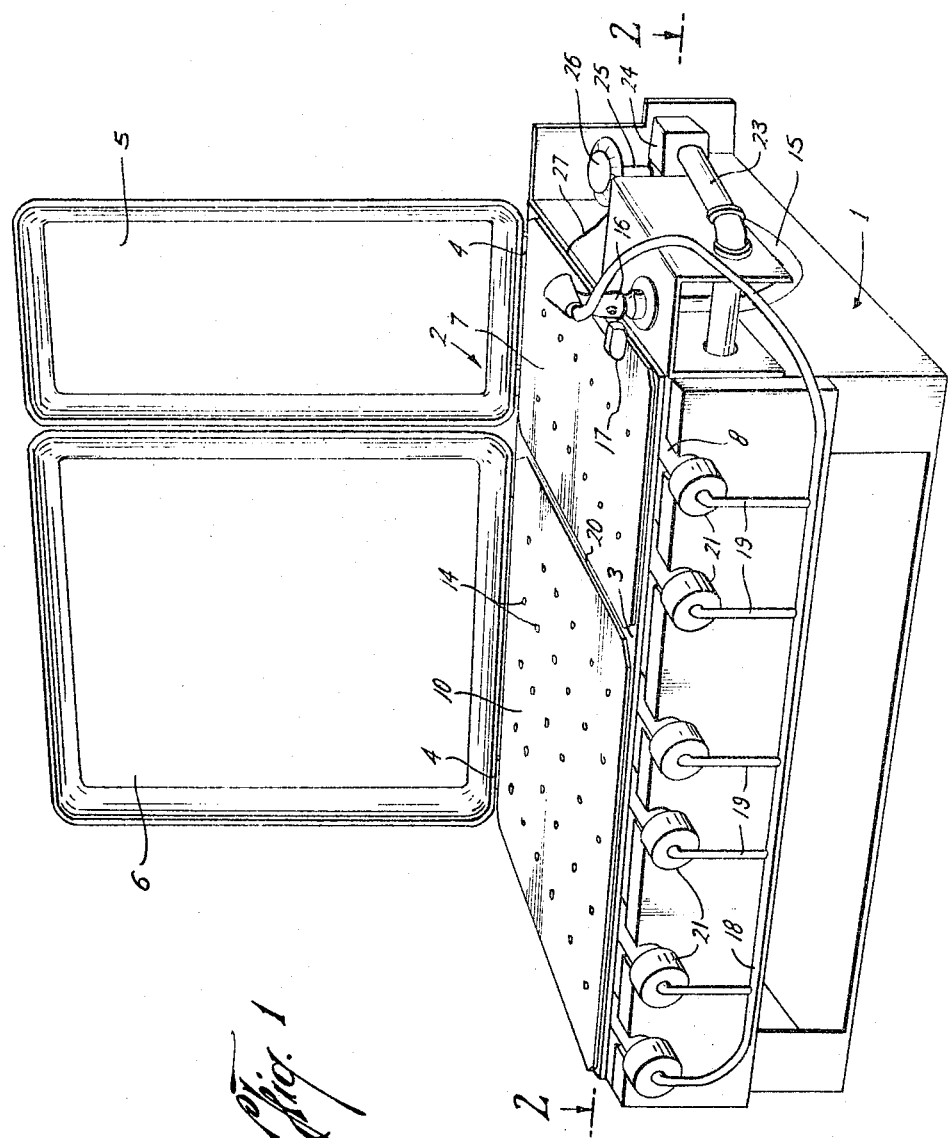
Rush E. Lassiter
INVENTOR.
BY Arnold and Roylance
ATTORNEYS Oct. 18, 1966  R. E. LASSITER  3,279,450
STEAM UNIT FOR FROZEN FOODS
Filed July 7, 1965  3 Sheets-Sheet 2
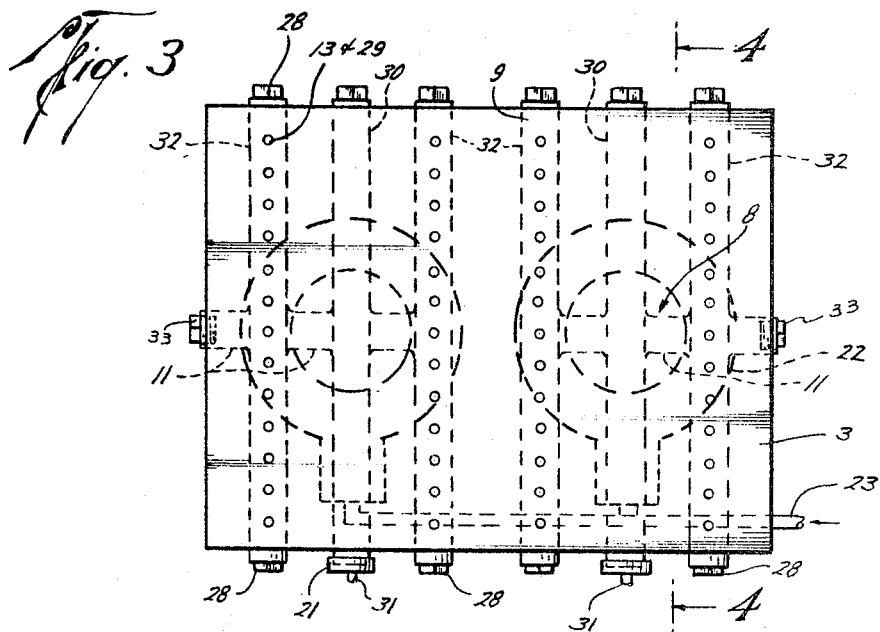
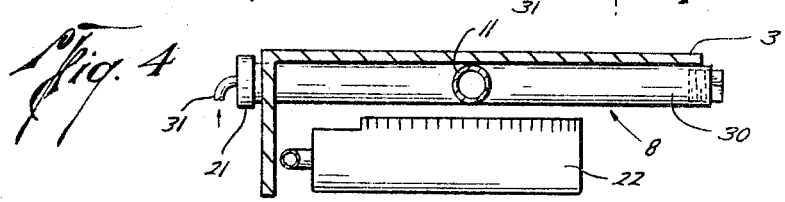
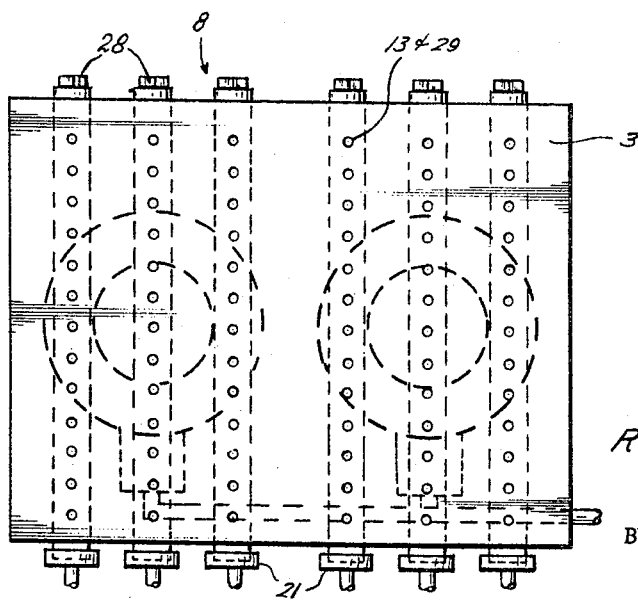
Rush E. Lassiter
INVENTOR.
BY Arnold and Roylance
ATTORNEYS

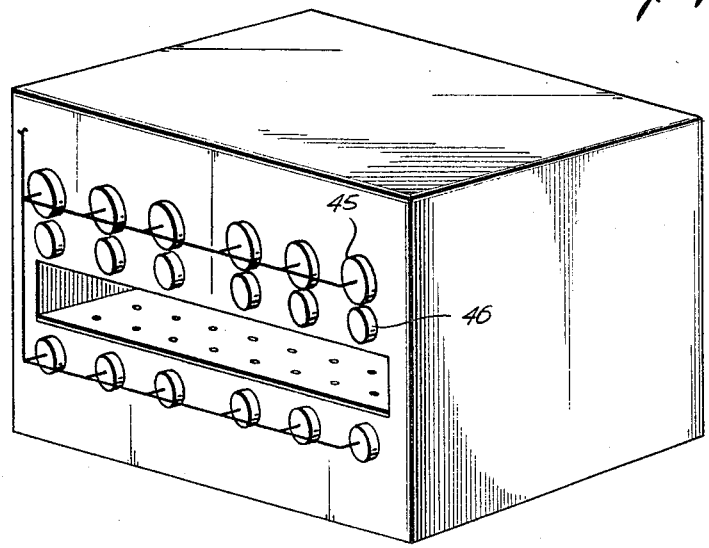
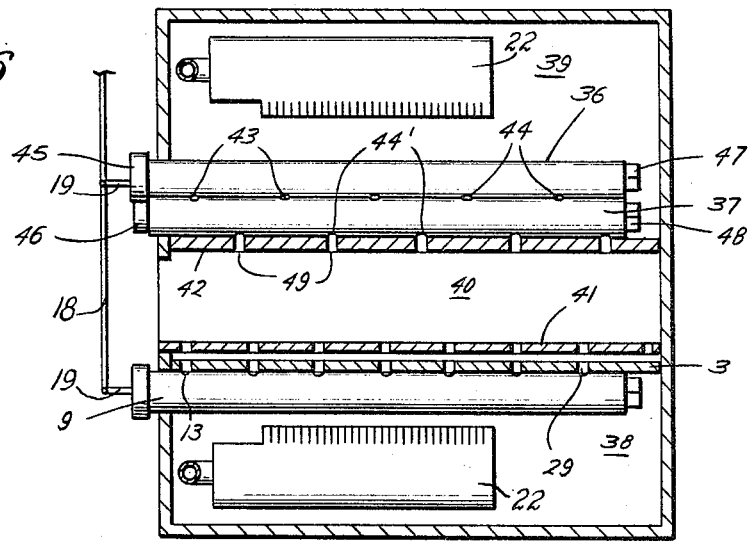
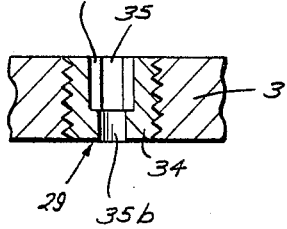

United States Patent Office 3,279,450
Patented Oct. 18, 1966

3,279,450
STEAM UNIT FOR FROZEN FOODS
Rush E. Lassiter, 1722 W. Thomas St., Hammond, La.
Filed July 7, 1965, Ser. No. 470,045
14 Claims. (Cl. 126—20)

This application is a continuation-in-part of my earlier filed application, Serial No. 321,225, filed November 4, 1963, now issued as U.S. Patent No. 3,203,414.

This invention relates to devices for heating articles with steam and more particularly to devices which employ a steam generating chamber which permits easy removal of scales or mineral deposits accumulated in the chamber when water containing the minerals is evaporated therein and which is further adapted for readily thawing frozen foods with no damage to the foods.

Prior art devices such as Klemm 2,973,705, Rittberger 1,809,867 and Lewis 2,674,935 all teach the use of steam to heat food products and the like. The steam is usually generated in a steam generating chamber which comprises a large dish shaped recess carried by the housing and into which water is injected and evaporated. These recesses are, generally speaking, relatively expensive to cast and very difficult and cumbersome to remove and clean. Often it is necessary to almost completely disassemble the device before the steam generating chamber is accessible to be cleaned.

It is therefore an object of this invention to provide an improved device for the steam heating of articles which employ a steam generating chamber readily accessible for cleaning and readily cleanable.

Other prior art devices teach the use of pressurized steam heating chambers to thaw frozen foods. While the presently known devices are satisfactory in a great many instances, it is quite often the case that the food is damaged by the high pressure maintained in the thawing chamber. With the increase in recent years of the use of frozen foods, a unit which will perform satisfactorily in all other respects without damage to the food being thawed is of extreme importance to the industry.

Accordingly, it is a further object of this invention to provide an improved steam heating device suitable for thawing frozen foods while at the same time protecting the foods being thawed from damage caused by high pressure.

Generally, the invention comprises an enclosure for containing the articles to be heated by steam communicated to the enclosure from at least one steam generating chamber, each of which employs at least one elongated member having an opening through which water in liquid or vapor state can be introduced and at least one end which is closed by an easily removable plug so that access may be easily had to the interior of the elongated member for removal of mineral scales deposited thereon by evaporating water. There are of course means provided for introducing water into the steam generating chamber and for evaporating the water once provided.

More specifically, in the drawings:

FIG. 1 is an isometric representation of a steam heating device which employs one embodiment of the invention.

FIG. 2 is a plan view along line 2—2 of FIG. 1.

FIG. 3 is a plan view similar to that of FIG. 2 except that a different embodiment of the steam chamber 8 is illustrated.

FIG. 4 is a section view along lines 4—4 of FIG. 3.

FIG. 5 is an isometric representation of a quick-thawing and heating apparatus according to another embodiment of this invention.

FIG. 6 is a sectional elevational view of the apparatus shown in FIG. 5.

FIG. 7 is a cross sectional view illustrating a particularly useful embodiment of this invention.

In the drawings the following reference numerals have been used to indicate parts as follows:

1—frame
2—enclosure means
3—bottom apertured plate
4—hinge
5—cover
6—cover
7—supporting plate
8—steam generating chamber
9—elongated members
10—supporting plate
11—conduits
12 (not used)
13—apertures
14—apertures
15—water inlet line
16—valve
17—level
18—water line
19—water line extensions
20—space
21—plug
22—gas burner
23—gas line
24—valve
25—thermostat
26—control dial
27—temperature sensing element
28—plug
29—apertures
30—elongate member
31—water inlet line
32—elongated members
33—plugs
34—insert
35—aperture
36—elongated member
37—elongated member
38—steam generating chamber
39—steam generating chamber
40—enclosure
41—apertured plate
42—apertured plate
43—aperture
44—aperture
45—plug
46—plug
47—plug
48—plug
49—apertures As exemplified by the embodiment illustrated in FIGS. 1 and 2 of the drawings, steam heating devices which embody the invention may comprise a main frame or housing 1 which supports enclosure means 2. Enclosure means 2, provided to house the articles to be heated by steam, may conveniently have a bottom defined by apertured plate 3, to the rear of which hinges 4 pivotally carry the two shell shaped separately movable covers 5 and 6. Cover 5 is adapted to be lowered like the lid of an automobile trunk until it covers article supporting apertured plate 7 which is supported in a parallel relationship above plate 3 by any suitable means. Similarly cover 6 is adapted to be lowered over article supporting apertured plate 10 which is also spaced in a parallel relationship above plate 3 by any suitable means. To permit the covers 5 and 6 to be lowered over plates 7 and 10, respectively, there is provided a space 20 between plates 7 and 10. Thus, by using the divided covers 5 and 6 enclosure means 2 has two compartments in which different type articles may be placed and separately heated. Instead of two compartments, it is often preferred to have a single compartment with, of course, a single cover. It will be understood that when the single compartment embodiment is employed, there will be no space 20.

As is obvious, pivotal movement of either of the covers 5 and 6 will allow an operator of the device to place articles to be heated into or remove articles after heating from the enclosure means 2.

Means are also provided for communicating steam to enclosure 2 and in the embodiments of the invention illustrated in FIGS. 1 and 2 the means conveniently take the form of steam generating chamber 8 which may comprise a plurality of elongated members 9 which in the embodiments illustrated take the form of pipes. Although elongate members 9 and apertured plate 3 are illustrated in the accompanying drawings as separate members, it is understood that the two may be made in a single member. Steam chamber 8 may be secured immediately below bottom plate 3 by welds or any other suitable means, or in the alternative chamber 8 may be positioned at some other point from which steam generated therein can be conveniently communicated to enclosure 2.

To allow steam communication from steam generating chamber 8 to the enclosure means 2, apertures 13 in elongated members 9 are provided to register with apertures 29 in bottom plate 3. Apertures 13 and 29 because they register one with the other are indistinguishable in the views illustrated by FIGS. 2 and 3. Steam passes from elongated members 9 through the registering apertures 13 and 29 into enclosure 2 where it passes upward through apertures 14 in supporting plates 7 and 10 and contacts the articles to be heated. Obviously other means may be employed to communicate steam generated in chamber 8 into enclosure 2 such as providing a small steam conduit between the elongated members 9 and enclosure 2 or by providing slots in the elongated members 9 and plates 3 or some other such expedient, all of which are obvious to one skilled in the art.

As is also obvious, means must be provided to communicate water to the steam generating chamber 8 and also to heat the water once provided so that it may be converted into steam.

In particular embodiment illustrated in FIGS. 1 and 2, the means for supplying water conveniently takes the form of a water inlet line 15 connected at one end to any common water supply and at the other to valve 16 of any common variety which is actuated by a lever 17 or more such means. Depression or upward movement of lever 17 depending upon the type valve 16 employed will permit water to pass through valve 16 into water line 18 to which are connected a plurality of extensions 19 connecting line 18 and plugs 21 which threadably engage like ends of elongated members 9. Extension 19 communicates water from line 18 through plugs 21 into elongated members 9 where it can be heated and/or evaporated.

In the particular embodiments illustrated, the means for heating the water once introduced into the elongated members 9 conveniently take the form of gas burners 22 positioned beneath steam generating chamber 8. Although the position of the heaters may not be critical, it has been found extremely desirable to place them immediately and directly beneath elongated members 9. Burners 22 are fed with any type combustible gas through gas line 23 which communicates with both of burners 22. Gas flow to burners 22 is regulated by valve 24 controlled by thermostat 25 which is set by control dial 26. Temperature sensing element 27 extends from thermostat 25 into enclosure 2 between bottom plate 3 and plates 7 and 10 so that the temperature of enclosure 2 can be controlled by predetermined setting of dial 26. If the temperature of enclosure 2 exceeds the predetermined setting on dial 26, the thermostat 25 will restrict gas flow through line 23 and control heat addition to enclosure 2. Of course it will be recognized by those skilled in the art that any suitable type of heating means might be used, and it is not necessary that a gas burner be used.

After ignition of burners 22, the operator of the device illustrated in FIGS. 1 and 2 can actuate lever 17 and introduce water into elongated members 9. Burners 22 heat elongated members 9 to such a temperature that the water introduced thereto will evaporate to effect steam generation producing steam flow through apertures 13 and 19 into enclosure 2. Best results have been obtained with the use of extreme heat, on the order of 750° F.

With continued use, the steam generating chamber 8 will fill with a scale of minerals deposited by the evaporating water. In the embodiment illustrated by FIGS. 1 and 2 for example, the scale will form on the interior of elongated member 9 reducing the efficiency of heat transmission to the members. Scale also forms in apertures 13 and 29 which if allowed to collect will impede steam flow into enclosure 2. This scale because of the temperatures at which it is formed is most frequently very bad and difficult to remove from the steam generating chamber.

Prior art devices have been plagued with this scale formation and in many instances the device has to be almost completely disassembled to gain access to the steam generating chamber. Once access is gained to the dish shaped steam generating chamber employed by most of the devices, the scale is removed by use of a chisel or some such tool.

To simplify the cleaning problems of the prior art the steam generating chamber 8 of the device illustrated in FIGS. 1 and 2 carries plugs 28 threadably engaged in like ends of elongated members 9. In similar manner the opposite ends of the elongated member 9, FIGS. 1 and 2, carry plugs 21 threadably engaged thereon.

Plugs 28 and 21 may extend from the device at any readily accessible point thereon to permit ready access to them should elongated members 9 need cleaning.

To clean scales and deposit from the elongated members 9, either plugs 28 may be removed, or in the alternative both plugs 21 and 28 may be removed. A reamer, drill, swab or some such tool is then run through the members 9 to remove scale from the interior surfaces thereof and a similar tool may upon removal of plates 7 and 10 be used to remove scale from the registering apertures 13 and 29.

Because frequent removal of scale from apertures 13 and 29 may be necessary, the apertures are preferably provided with an annular insert of hardened metal to minimize enlargement of the apertures due to repeated drilling, reaming, swabbing, or the like. One embodiment of such an insert is illustrated in FIG. 7, where the aperture 29 is provided with a hard metal insert 34. The insert 34 has therein another aperture 35. When scale has formed in aperture 35, an appropriate tool is inserted therein and the scale thus removed. After a period of time, the walls around insert 35 will have become damaged from continued insertion of the scale-removing tool. When this happens, the insert 34 is removed and replaced with a new insert 34.

As illustrated in FIG. 7, aperture 35 is often preferably formed in two parts, upper aperture 35a and lower aperture 35b. By "lower" aperture is meant that part of aperture 35 most remote from the enclosure means. The lower aperture is of lesser cross section than the upper aperture, and is desirably also of lesser length. It will be understood that aperture 35 is cleaned from the enclosure means side by an operator using a suitable tool. Thus the greater cross sectional area of the upper aperture combined with the lesser length of the lower aperture, results in a structure that is particularly advantageous in that it provides great facility in the cleaning of aperture 35.

Thus, it can be seen that steam chamber 8 may be readily cleaned after the simple removal of plugs 28 and/or plugs 21 and apertures 13 and 29 cleaned after removal of plates 7 and 10 all of which can be accomplished with minimal disassembly of the device and time consumption. Indeed in a preferred embodiment of the invention apertures 14 in plates 7 and 10 are positioned to register with apertures 13 and 29 so that plates 7 and 10 need not be removed to permit apertures 13 and 29 to be "drilled out".

FIGS. 3 and 4 illustrate an alternative embodiment of steam chamber 8 which is similar to the one illustrated in FIGS. 1 and 2, but which varies in some detail.

The embodiment illustrated by FIGS. 3 and 4 employs a central elongated un-apertured member 30 in each bank of elongated apertured members 32. Water is introduced into these central elongated members 30 through water inlet lines 31 like inlet lines 19 already described. Steam generated in the central member 30 communicates through elongated member communicating conduits 11 into one and/or both of the adjacently positioned elongated members 32 where it can be further evaporated and/or superheated. The middle member 30 is not provided with apertures so that primary generation of steam can be effected therein and superheating of steam can be effected in the adjacently positioned member 32 before the steam is communicated to enclosure 2. Thus, articles to be heated with the steam will not become soggy by contact with saturated steam, if by the nature of the article such is possible.

While the embodiment of the steam chamber 8 illustrated in FIGS. 1 and 2 can of course produce superheated steam if burners 22 are so adjusted, the embodiment of the invention illustrated by FIGS. 3 and 4 is preferred.

To permit easy cleaning or removal of scale deposits, the elongated members 30 are provided with plugs 21 and 28 like elongated members 9 of FIGS. 1 and 2. Elongated members 32 are provided at both ends with plugs 28, and as is obvious the steam chamber 8 of FIGS. 1 and 2 and the steam chamber 8 of FIGS. 3 and 4 are cleaned by similar methods already described.

As is obvious in the embodiment illustrated in FIGS. 3 and 4, scale will also form on the inside surface of connecting conduits 11 which communicate the elongated members 30 and 32. To permit ready access to the conduits 11 for easy removal of scale therein the conduits 11 threadably carry plugs 33 in the outermost segments thereof. Inasmuch as the conduits 11 are axially aligned in each bank of elongated members 30 and 32, a drill, swab, or some such tool already referred to can be injected and used to remove scale from the conduits after removal of plugs 33.

A particularly useful embodiment of this invention is illustrated in the embodiment shown in FIGS. 5 and 6. In the embodiment illustrated in FIG. 5 is a unit comprising two steam generating chambers with enclosure means located therebetween. The lower steam generating chamber 38 is desirably constructed according to the embodiments shown in either of FIGS. 2 or 3. Enclosure means 40 is advantageously defined by bottom apertured plate 3 which separates the enclosure from the lower steam generating chamber, and upper apertured plate 42, which separates the enclosure from the upper steam generating chamber 39. In spaced relationship above bottom plate 3 is apertured support plate 41. Of course, while 41 and 42 are illustrated herein as plates, other means might be used instead for either of these plates. For example, plate 41 may advantageously be replaced by a wire rack.

Upper steam generating chamber is constructed in a manner similar to lower steam generating chamber with one exception: it is much preferred that the elongated members be arranged in vertically aligned pairs with offset apertures. This configuration of the elongated members is illustrated in FIG. 6, where pairs of elongated members 36, 37 are vertically aligned. Elongated member 36 has therein plugs 45 and 47, and elongated member 37 has therein plugs 46 and 48; by removal of the plugs, the elongated members may be readily cleaned of scale. Elongated member 36 also has therein apertures 43, and elongated member 37 has apertures 44 which register with apertures 43, and apertures 44' which are vertically offset from the apertures 43. By this construction the possibility of water which has not yet been vaporized dripping onto the articles in enclosure means 40 is greatly reduced. That is, there will usually be some water which has not yet been sufficiently heated to have vaporized which will be ejected through apertures 43. This water will be vaporized upon entrance into the additional elongated member 37, however, and only steam will be emitted through apertures 44' into enclosure means 40.

It is generally preferred that apertures 44' register with the corresponding apertures 49 in upper plate 42. And of course it is recognized that plate 42 could be omitted altogether.

It is understood, of course, that water is permitted to enter into elongated member 36 only; that is, plugs 46 and 48 are included only for the purpose of facilitating cleaning of scale from elongated member 37.

Any suitable type of heaters, such as the type described above in connection with the embodiments of FIGS. 1–4, and as designated 22 in FIG. 6, may be employed to heat the water which flows in elongated members 36 and 37 in the upper steam generating chamber. Of course the heaters in this steam generating chamber will be positioned above or to the side of, rather than below, the elongated members 36 and 37.

The unit described in the embodiment of FIGS. 5 and 6 is particularly useful for the purpose of quick thawing of frozen foods. Many foods cannot be successfully quick-thawed in apparatus presently on the market, since they are damaged by the high pressure at which the present machines operate. For example, green peas are crushed by even 15 pounds per square inch gauge pressure. In the unit illustrated in FIGS. 5 and 6, however, these foods may be instantly thawed and cooked without any damage whatsoever, as this unit may be successfully operated at essentially zero pressure, gauge.

Obviously various changes may be made in the embodiments illustrated and various other embodiments may be conceived and constructed, all of which would embody the invention. For example, electrically resistive heating rods could be used as a heat source rather than the gas burners illustrated.

Additionally, with minor alterations the device could be used as a sterilizer or pressure cooker.

Further, while specific terms have been used to describe the disclosed embodiments, these terms should not be construed to limit the invention as described in the following claims:

I claim:
1. An apparatus for quick thawing and heating of frozen foods comprising:
   enclosure means for containing the articles to be heated;
   a pair of substantially parallel apertured plates defining the top and bottom of said enclosure means,
      steam generating chambers located beneath said bottom plate and above said top plate;
   said bottom chamber having therein at least one elongated member;
   said top chamber having therein at least one pair of vertically aligned elongated members;
      each of said elongated members having apertures therein, and each of said elongated members having a plug in at least one end thereof;
      means for introducing water into said elongated members; and,
      means for vaporizing the water thus introduced, whereby said vapor will be emitted through the apertures in said elongated members into said enclosure through said upper and lower apertured plates.
2. An apparatus in accordance with claim 1 wherein:
   the apertures in said elongated members adjacent said parallel plates register with the apertures in said plates.
3. An apparatus in accordance with claim 2 wherein:
   each of said apertures in said bottom plate has therein an insert of hard metal;
   said hard metal insert having therein an aperture through which vapor may pass.
4. An apparatus in accordance with claim 3 wherein:
   said aperture in said hard metal insert is constructed in two parts, said upper part being of larger length and large cross section in relation to said lower part.
5. An apparatus in accordance with claim 1 wherein:
   the apertures in one elongated member of each of said pair of elongated members in said upper steam generating chamber are vertically offset in relation to the apertures in the other elongated member of said pair.
6. An apparatus for quick thawing and heating of frozen foods comprising:
   an enclosure means for containing the articles to be heated and thawed, said enclosure located between upper and lower steam generating chambers, said upper steam generating chamber having therein at least one pair of elongated members, the upper member of said pair having apertures in the bottom portion thereof, the lower member of said pair having apertures in the bottom portion thereof which are vertically offset from the apertures in said upper member, said lower steam generating chamber having therein at least one elongated member having apertures in the top portion thereof;

each of said elongated members having a removable plug in at least one end thereof, whereby the interior of the elongated member may be cleaned upon removal of said plug;

means for introducing water into at least one of said elongated members in each said upper and said lower stream generating chambers, and, means for heating said water, whereby the vapor thus formed will flow from said elongated members through the apertures therein to said enclosure means.

7. An apparatus for quick thawing and heating of frozen foods comprising:

an enclosure means for containing the articles to be heated and thawed, said enclosure located between upper and lower steam generating chambers, a pair of substantially parallel apertured plates separating said enclosure from said steam generating chambers, said upper steam generating chamber having therein at least one pair of elongated members, the upper member of said pair having apertures in the bottom portion thereof, the lower member of said pair having apertures in the bottom portion thereof which are vertically offset from the aperture in said upper member, said lower steam generating chamber having therein at least one elongated member having apertures in top portion thereof;

each of said elongated members having a removable plug in at least one end thereof, whereby the interior of the elongated member may be cleaned upon removal of said plug;

means for introducing water into at least one of said elongated members in each said upper and said lower steam generating chambers, and means for heating said water, whereby the vapor thus formed will flow from said elongated members through the apertures therein and through the apertures in said parallel plates into said enclosure means.

8. An apparatus in accordance with claim 7 wherein: the apertures in said lower member of said pair of elongated members in said upper steam generating chamber, and the apertures in said elongated member in said lower steam generating chamber are in registration with the apertures in said top and said bottom parallel plates, respectively.

9. An apparatus in accordance with claim 8 wherein: the apertures in said elongate members of said lower steam generating chamber have therein inserts of hard metal, said inserts having openings therein.

10. An apparatus for quick thawing and heating of frozen food comprising:

enclosure means which include means for supporting the articles to be heated;

a pair of steam generating chambers located above and below said enclosure means;

each of said steam generating chambers having therein at least one elongated member, each of said elongated members having therein apertures, and each of said elongated members having a removable plug in at least one end thereof, means for introducing water into said elongated members, and means for heating said water whereupon the vapor thus produced will flow through the apertures in said elongated members into said enclosure means.

11. An apparatus for quick thawing and heating of frozen foods comprising:

enclosure means which include means for supporting the articles to be heated;

a pair of steam generating chambers located above and below said enclosure means;

a pair of substantially parallel apertured members separating said enclosure from said steam generating chambers, each of said steam generating chambers having therein at least one elongated member, each of said elongated members having therein apertures, and each of said elongated members having a removable plug in at least one end thereof, means for introducing water into said elongated members; and, means for heating said water, whereby the vapor thus formed will flow from said elongated members through the apertures therein and through the apertures in said parallel members into said enclosure means.

12. An apparatus in accordance with claim 11 wherein the apertures in said elongated members in the lower of said generating chambers have therein inserts of hard metal, said inserts having apertures therein.

13. An apparatus for quick thawing and heating of frozen foods comprising:

enclosure means which include means for supporting the articles to be heated;

a pair of steam generating chambers located above and below said enclosure means;

a pair of substantially parallel apertured members separating said enclosure from said steam generating chambers, each of said steam generating chambers having therein at least one elongated member, each of said elongated members having therein apertures, and each of said elongated members having a removable plug in at least one thereof, means for introducing water into said elongated members;

means for heating said water, whereby the vapor thus formed will flow from said elongated members through the apertures therein and through the apertures in said parallel members into said enclosure means; and, an apertured support member for supporting the foods to be thawed.

14. An apparatus for heating articles by contacting the articles with steam comprising:

enclosure means for containing the articles to be heated;

a pair of substantially parallel plates carried by the enclosure means, said plates having apertures therein, one of the plates defining the bottom of the enclosure and the other, a supporting plate, being maintained in a spaced relationship directly thereabove for supporting articles to be heated;

a steam generating chamber carried beneath the enclosure means for introducing steam thereto, the steam generating chamber comprising, at least one elongated member disposed beneath the bottom plate adjacent thereto and having apertures therein which register with the apertures in the bottom plate, each of said apertures having therein a hard metal insert, said insert having an aperture therein, part of said aperture being of greater length and greater cross-section than another part of said aperture, the elongated member also having an opening through which water in liquid or vapor state can be introduced thereto and at least one end which is closed by an easily removable plug to permit access to the interior of the member for rapid and efficient removal of materials deposited therein by evaporating water;

means for introducing water into the steam generating chamber;

means for heating and vaporizing water introduced into the steam generating chamber permitting the steam generated thereby to pass through the registering apertures into the enclosure means and contact articles placed on the supporting plate.

References Cited by the Examiner

UNITED STATES PATENTS

| | | | |
|---|---|---|---|
| 201,242 | 3/1878 | Grinnell | 239—602 X |
| 541,637 | 6/1895 | Sewell | 122—361 X |
| 958,842 | 5/1910 | Stephenson | 122—361 |
| 1,231,726 | 7/1917 | Gault | 158—116 |
| 1,262,431 | 4/1918 | Backstrom | 158—116 |
| 1,940,171 | 12/1933 | Huss. | |
| 2,674,935 | 4/1954 | Lewis et al. | 126—369 X |
| 3,175,772 | 3/1965 | Marshall | 239—602 |
| 3,203,414 | 8/1965 | Lassiter | 126—369 |

FREDERICK L. MATTESON, JR., *Primary Examiner.*

ROBERT A. DUA, *Examiner.*